Sept. 29, 1970     F. P. RICHE     3,530,575

WIRE STRIPPER, PARTICULARLY FOR PAIRED CONDUCTORS

Filed Oct. 3, 1968     2 Sheets-Sheet 1

FRANK P. RICHE
INVENTOR.

BY *[signature]*

ATTORNEY

Sept. 29, 1970  F. P. RICHE  3,530,575
WIRE STRIPPER, PARTICULARLY FOR PAIRED CONDUCTORS
Filed Oct. 3, 1968  2 Sheets-Sheet 2
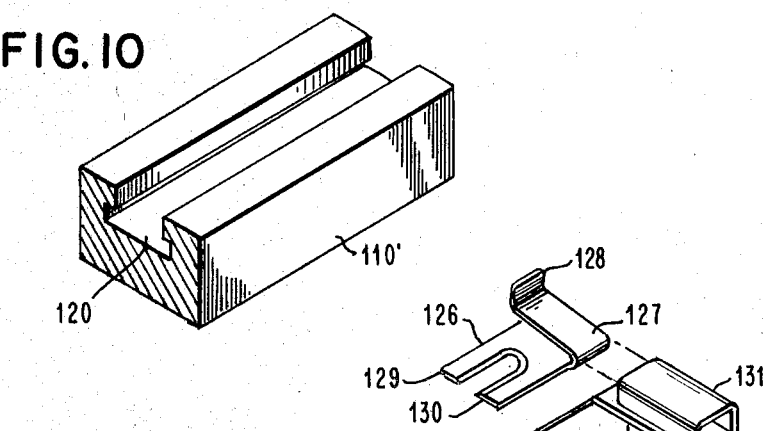
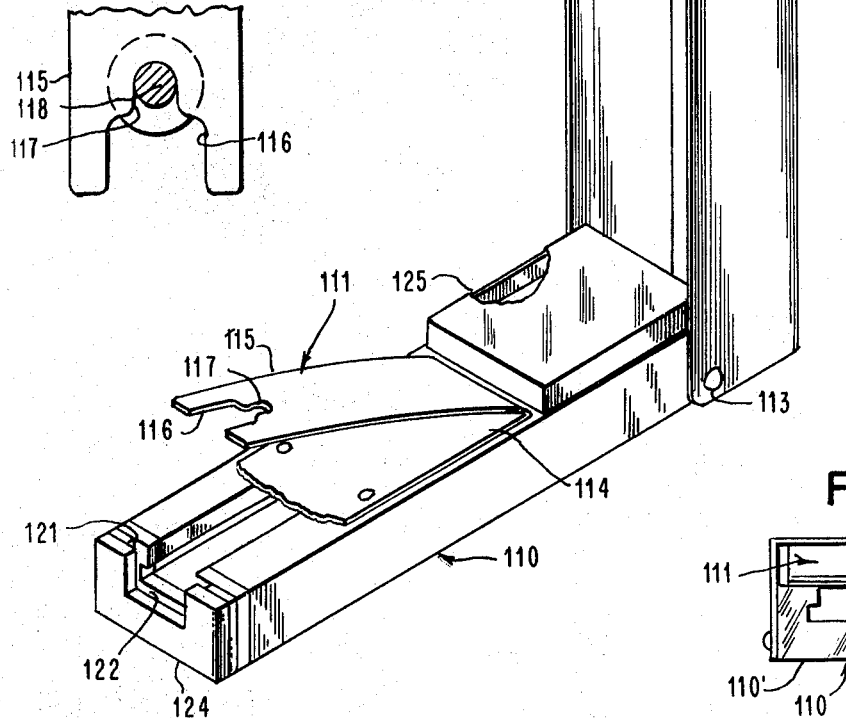
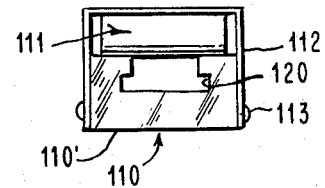
FRANK P. RICHE
INVENTOR.
BY
ATTORNEY United States Patent Office 3,530,575
Patented Sept. 29, 1970

3,530,575
WIRE STRIPPER, PARTICULARLY FOR PAIRED CONDUCTORS
Frank P. Riche, 550 Rosedale Ave., Bronx, N.Y. 10472
Filed Oct. 3, 1968, Ser. No. 764,836
Int. Cl. B21f *13/00;* H02g *1/12*
U.S. Cl. 30—91.2                                                16 Claims

ABSTRACT OF THE DISCLOSURE

An elongated housing has a hollow longitudinally extending locating channel formed to receive a pair of conductors, for example 300 ohm television lead-in wire, appliance connection cord and the like; a cutter blade is mounted on the housing and movable perpendicular to the channel, the cutter blade having cutting edges defining a cutting zone which is arranged to pierce the part of the insulation between the wires and cut the web between the wires (or, for coaxial cable, a portion of the jacket) so that, when the wire is pulled out of the housing, the remaining insulation along the outside of the wire will tear, the cutter being retained in its position by bearing against the end face of the housing.

---

The present invention relates to wire stripping tools, and more particularly to tools to strip parallel conductor wires, such as television entrance cable, appliance cord, or the like. The invention is, however, not restricted for use only with parallel conductor wire, but may also be used with co-axial cable, or single-conductor wires.

Wire strippers usually provide a pair of cutting edges, either formed of a plier-type tool or of knife blades, which bear against each other, the cutting edges have semicircular notches to prevent damage to the electrical conductor inside the insulation. Because of the construction of such wire strippers, it has been impossible to strip both wires of parallel conductors in one operation.

It is an object of the present invention to provide a wire stripping tool which is capable of universally stripping single conductors, co-axial conductors, and parallel conductors, and which is thus particularly useful as a hand tool for television installers who may encounter parallel conductor and co-axial lead-ins, as well as parallel appliance cord wires.

SUBJECT MATTER OF THE PRESENT INVENTION

Briefly, an elongated housing is provided which has a longitudinally extending locating channel therein through which the wires to be stripped are passed. At the far end of the housing, the channel terminates at an end edge face substantially perpendicular thereto. The wire is passed through the channel to an extent therebeyond by the length which is to be stripped. A cutter blade is mounted on the housing, movable perpendicularly to the channel and in front of the end edge face. The cutter blade has cutting edges formed thereon, arranged to sever a portion of the insulation. When the cutter blade is brought downwardly against the housing—the top of the housing may simultaneously form a stop—a portion of the insulation will be severed; upon a sharp pull on the wire at the end which was inserted into the housing, the remainder of the insulation will tear and the wire will come clean. Since the cutter blade is mounted directly on the housing, it can be readily interchangeable, and different shapes and sizes of cutter blades can be mounted to accommodate different wires to be stripped. Thus, only one basic tool is necessary, with readily replaceable cutter blades to fit specific applications.

By providing a piercing point on the cutter blade, the web between various types of wires, for example appliance cord and parallel-two-conductor television cable is severed so that the insulation is easily stripped; other cutter blades can be shaped so as to fit both co-axial as well as parallel two-conductor wire. Even if the tool is to be used with co-axial conductor, it need not be rotated around the conductor (or the conductor rotated therein). By shaping the cutter blade so it cuts laterally as well as on top of the jacket of co-axial wire, three sides of the insulation jacket will be severed thereby and the fourth side is readily torn off when the wire is pulled through the housing.

Deformation and damage to the cutter blade is prevented by guiding the cutter blade in front of the end edge face, the cutter blade bearing against the end edge face during the severing of the insulation and being retained in position relative to the conductors by the guides for the cutter blade.

The structure, organization, and operation of the invention will now be described more specifically with reference to the accompanying drawings, wherein:

FIG. 9 is a perspective view of a different form of wire stripper, having replaceable cutter elements;

FIG. 10 is a partly perspective sectional view of the housing block;

FIG. 11 is a rear view of the wire stripper of FIG. 9, with the tray for replaceable cutters removed; and FIG. 12 is a bottom plan view of the holding arrangement for the cover of housing.

Figure 1:
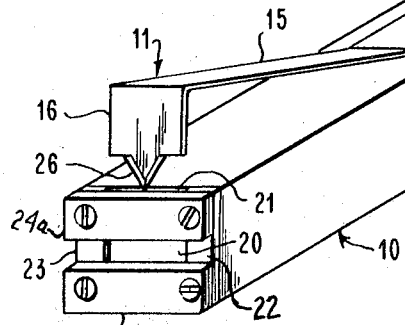
FIG. 1 is a perspective view of the assembled wire stripper.

The wire stripper essentially comprises a housing 10 of sufficient size to be gripped lengthwise by the hands of the user. The housing may be of lightweight metal, plastic or the like, square or round or of any other suitable and convenient shape to be gripped. For purposes of simplictiy it is shown to have rectangular cross-section.

A leaf spring 11 is secured on the top side of the housing, for example by a screw and wing nut combination 12, so as to be easily removable; a bayonet-type slot, or other holding arrangement is equally suitable. Leaf spring 11 is, at the same time, the actuating member as well as the cutter element to cut into the insulation. Leaf spring 11 has a flat section 14 where it is secured to the housing 10, a bent-up section 15, and a sharply-angled cutting section 16. Cutting section 16, at the downward end, is sharpened to form a cutter blade, arranged to cut into and pierce insulation surrounding electrical wires. The shape of this cutting edge, forming a cutting zone within the insulation, can easily be varied and will be discussed in connection with FIGS. 2 to 8 below.

Housing 10, which is elongated, has a longitudinal channel 20 extending therethrough. The shape of this channel, and its size, determines the kind of wire which the tool can handle. The front end of housing 10 has a front face 21 which is perpendicular to the extent of the channel. Cutting section 16 of leaf spring 11 fits just over the front face 21. The sides of the front face 21 project slightly, as seen at 22, 23; projections 22, 23, define together with the front face a pair of guides for the cutting section 16. A front cover plate 24 is secured to projections 22, 23, so that cutting section 16 cannot be bent outwardly in case a wire is inserted backwards into the stripping tool. An upper cross bar 24a additionally guides the cutter.

To strip off insulation from a wire, the complete, insulated conductor is inserted through channel 20 of the wire stripper to extend beyond from face 21 by the length to be stripped. Thereafter, leaf spring 11 is pressed downwardly until the cutting section 16 pierces the insulation. The downward travel of the cutter blade is limited by the location of the top of the housing. After the cutter blade has penetrated into the insulation, and is held closed against the housing, the wire is pulled sharply in the direction of arrow 25 and any insulation in front of the cutter blade, that is extending through front face 21 is stripped off, the wire coming clean. Due to the shape of the cutting element, as will be discussed below, a sufficient amount of insulation will be severed, so that the remaining portion will readily tear upon pulling of the wire in the direction of arrow 25.

Figure 2:
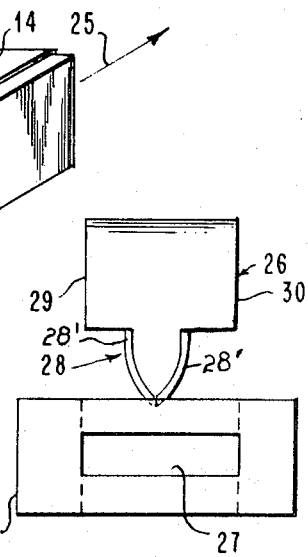
FIG. 2 is a schematic front view of the shape of the channel and the cutter blade for two-conductor parallel, 300 ohm television lead-in wire.

FIG. 2 illustrates, in greater detail, a cutter 26, adapted to cooperate with a channel 27, of just slightly greater width than that of an ordinary 300 ohm television lead-in wire of the parallel conductor, twin-lead type, and just slightly higher than the greatest thickness of the lead-in. Cutter blade 26, itself, has a central piercing point 28, leaving a pair of lateral shoulders 29, 30, which may be left unsharpened. Cutting edges 28', 28' on the point will pierce the central web of the twin-lead conductor. The widest portion of the point, between the shoulders 29, 30, corresponds to that of the conductor spacing of standard twin-lead conductors. Thus, the central connecting web, usually mechanically the strongest part of the lead-in, will be pierced and cut entirely. The thin remaining plastic insulation around the outside of the conductors itself will readily tear upon pulling on the wire in the direction of arrow 25.

Figure 3:
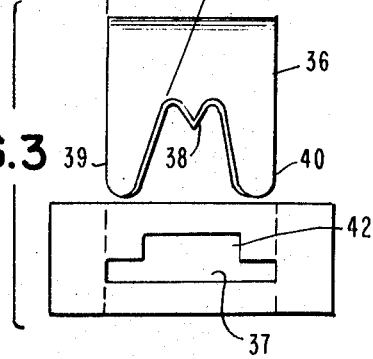
FIG. 3 is a view of the channel for twin-lead television, as well as appliance cable with a cutter for twin appliance wire.

If the tool is intended for use primarily with twin-lead for power connection, such as appliance cord or parallel conductor wire known as zip-cord, then the channel shape and cutter of FIG. 3 can be used. Channel 37 is at least as wide as the width of the conductors to be accommodated, but may be wider, for example to also accommodate television twin-lead. The height of the channel is, again, slightly greater than that of the wire to be accommodated, so that the entire channel will have a bulge in the middle, as seen at 42. The cutter 36 is essentially U-shaped, with a pair of lateral legs 39, 40; the bottom of the U is, however, convex and forms a slightly central projection 38. The inner, that is the cutting sides of legs 39, 40 are preferably angled by an angle indicated at 41, so as to cut gradually into the insulation. As can readily be seen, central point 38 will penetrate the insulation between the parallel conductors; the outer legs will penetrate the insulation at the outside, and the cutting edges at the junction of the legs and the central point will substantially surround the wire, cutting through most of the insulation so that it can be stripped off easily upon pulling in the direction of arrow 25.

Figure 4:
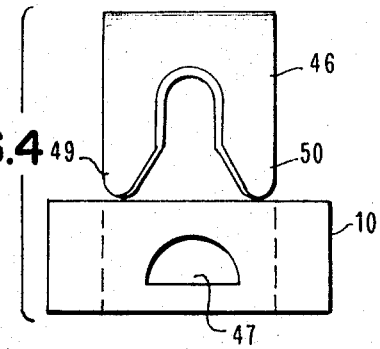
FIG. 4 is a view of the channel shape and cutter for co-axial cable.

To strip single-conductor wire, or the jacket of co-axial cable, for example of from 5 to 10 mm. diameter, a channel and cutter arrangement as in FIG. 4 is suitable. Cutter 46 has U-shaped cutting edges formed by a pair of converging legs 49, 50. Channel 47 in the housing is circular, or at least has one circular side so that the round conductor is positively located with respect to a central point of convergence of the cutting edges of legs 49, 50. To strip the outer jacket of co-axial cable, the cutter with the blade shown in FIG. 4 is brought down against the co-axial wire, the legs 49, 50 cutting through the outer insulating jacket. The jacket can then be stripped off by pulling in the direction of arrow 25, leaving the outer, conductive covering of co-axial cable exposed. The outer conductive covering of the co-axial cable may then be rebraided, and the end piece of the insulation for the central conductor can readily be removed as customary.

Figure 5:
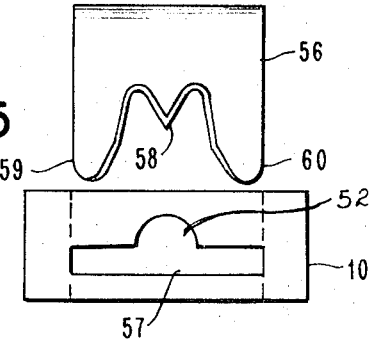
FIG. 5 is a view of the channel universally applicable for large size co-axial cable, and heavy-duty twin-conductor television lead wire, with a cutter for heavy-duty twin lead.

FIG. 5 shows a channel 57 which can be used to cut both large size co-axial cable, twin-lead television wire both of the indoor as well as heavy-duty outdoor type, in combination with a cutter for heavy-duty outdoor TV twin lead. Cutter 56 again has inwardly angled converging legs 59, 60, separated by a central point 58. The junction between the legs 59, 60 and central point 58 is rounded. The channel 57, itself, at its extremities, is wide enough and high enough to accommodate the heaviest duty outdoor type twin-lead; in the center, the channel is formed with a bulge 52, high enough to accept the largest size expected co-axial wire and having a sufficient height at a lateral extent to accommodate appliance cord and zipcord.

To cut the insulation in parallel two-conductor wires, the central point 58 will penetrate into the web of insulation between the parallel conductors. Angling the cutting edges along the inner sides of legs 59, 60 provides for gradual cutting around the outer portion of the insulation of heavy-duty twin-lead. The rounded ends between the projection and the legs 59, 60 will be located at the same place where the conductors, all of standard separation in order to provide standard 300 ohm line, are also located. The insulation of heavy-duty twin-lead is usually so tough that cutting around the conductors is desirable for ease of tearing off the uncut remainder.

Figure 6:
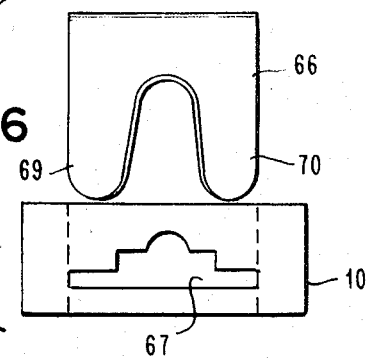
FIG. 6 is a schematic view of the channel universally applicable for co-axial cable, twin appliance wire and television lead-in wire, with a cutter for small size co-axial, or single-wire conductor.

If the tool is intended to be used with small diameter co-axial wires, or single wires, as well as with appliance twin conductors and TV lead-ins, then the channel 67 illustrated in FIG. 6 is suitable. FIG. 6 shows a cutter 66, having a U-shaped cutting dome formed by legs 69, 70 and movable in front of a channel 67, which may be in the form of a round circular hole extending longitudinally of elongated handle 10, suitable for stripping small diameter co-axial cable.

Figure 7:
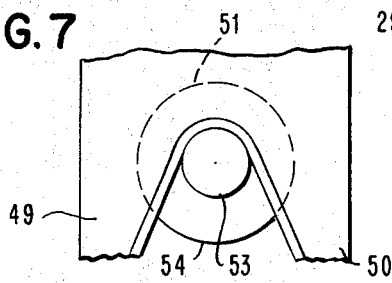
FIG. 7 is an enlarged view illustrating cutting of co-axial cable.
Figure 8:
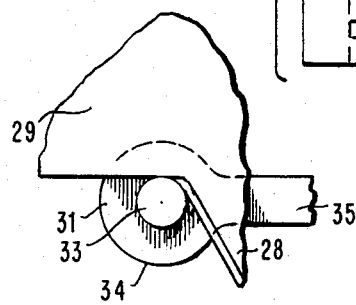
FIG. 8 is an enlarged view illustrating cutting action of 300 ohm TV twin lead.

FIGS. 7 and 8 illustrate, in detail, how the cutting action is effected. In FIG. 7, a blade having the shape of blade 46 (FIG. 4) or 66 (FIG. 6) has pierced and passed through the insulation jacket 51 of a wire, surrounding at three sides a conductive braid 53. As can readily be seen, the cut zone of the insulation of the wire indicated in dashed lines is much larger than the uncut one and pulling of the wire with respect to the cutter will readily strip off the insulation, which has been cut along the inside edges of legs 49, 50, and which can tear in the region 54 even where the insulation has not been severed.

The cutting action of twin-lead is essentially similar. FIG. 8 shows, in a greatly enlarged scale, this operation. A cutter of the shape of FIG. 1 or FIG. 2, of which only section 29 and a portion of central point 28 are shown, has been moved downwardly against a twin-lead, only one-half of which is illustrated. Conductor 33 fits into the notch formed between point 28 and shoulder 29. Insulation 31, again shown in dotted lines, has already been severed, leaving only a small portion of insulation 34 surrounding conductor 33 which has not been severed. The tough web 35 of the twin-lead has been completely cut.

To accommodate different slizes of wire, a movable stop may be arranged at the top of housing 10, and just beneath the point of engagement with leaf spring 11, when the leaf spring is entirely depressed, for example by forming a movable wedge thereon, or providing a longitudinally slidable bar in the form of a loop, surrounding housing 10, and slidable beneath the bent-up section 16 of leaf spring 11, to provide for a variable engagement of leaf spring 11 therewith.

Forming the cutter blade and leaf spring as a single unit, for example of readily sharpened hard steel spring material, readily removable and replaceable from the housing, provides a simple and easily manufactured unit. It is, of course, also possible to extend the front face 21 transversely to the channel, and, by means of extended projections 22, 23 and front cover plate 24, to provide for separtae cutter elements, operated by means of a permanently secured spring 11. Such small cutter elements may readily be formed in various sizes, for easy replacement and location within the slot formed between the front face 21 and front cover plate 24.

FIGS. 9 to 12 illustrate a different embodiment of wire stripper practicing the present invention, in which replaceable cutter elements are used. A housing block 110', having a channel 120, which may be a groove (see FIG. 10) cut therein, of suitable shape and dimension to accept television lead-in, both of the indoor and heavy-duty type, or appliance cord, co-axial cable or the like as explained in connection with FIGS. 2 to 6, has a top cover 112 hinged to housing block 110' at hinge points 113. The groove or channel 120 is closed off by a spring 111, having a flat part 114 and a bent-over section 115. The flat part 114 extends to the end 121 of housing block 110', being shown broken away in FIG. 9 for clarity of illustration. Spring 111, at its bent-over end is formed with a notch having a widened part 116 and a narrow part 117. The housing cover 112 has a headed button, such as a headed screw 118 at the end. When the top cover 112 is closed, the head of headed button or screw 118 will snap below a narrow portion of the groove 117, as best seen in FIG. 12. In order to raise the top cover completely, slight pressure on the spring in the region 115, for example by inserting a finger under the spring will permit the top cover to slip out of the narrow groove 117 into the wider groove 116 and release the top cover.

Spring 111 is bent over intermediate the length of the entire tool 110, so as to leave room for a tray 125, in which replaceable cutters 126 can be stored. Only a single cutter of the type illustrated in FIG. 6 is shown, it being understood that the cutters for use with the wire stripper of FIGS. 9 to 12 may be formed in any of the shapes previously explained in connection with the description of FIGS. 2 to 6. The cutters for use in the embodiment of FIG. 9 may, again, have a pair of legs 129, 130, and have an integral re-entrance spring portion 127, with a bent-over end 128, which portion 127, 128 fits into a channel formed by an overlapping hook-shaped projection 131. The bent-over end 128 acts as a stop to positively locate cutter 126 with respect to the center of the channel 120.

The front end of the tool, in advance of its end 122 is formed with a guide groove 121, for example defined by a front plate 124 suitably secured by means (not shown) to a spacer member, or, for example, by an integral front plate 124 with a milled-in groove 121.

FIG. 11 illustrates a rear view of the entire tool, with the cutter tray 125 removed, showing that sufficient space is available for the tray; in operation, the top cover 112, with a cutting tool 126 inserted therein is pressed downwardly which will still leave sufficient room for tray 125. The cutters, as before, will be guided in the guide groove 121 at the front of the tool. In all respects, the operation of the tool in FIG. 9 is similar to the operation described in connection with FIGS. 1 through 8. To change cutter blades, it is only necessary to raise the tool sufficiently so that the cutter blade 126 will be released from the guide groove 121, which can be accomplished by releasing the housing cover 112 from spring 111, and exchange blades which can be carried in tray 125.

The present invention therefore provides a wire stripping tool which is easily handled, permits use in small and tight spaces, and is universally applicable for many types of wires; and further permits stripping of two-conductor parallel wires, such as appliance cord, zipcord, or high frequency twin-lead in one single operation. This is accomplished, essentially, by severing the central web, so that the portion of insulation which is not cut by the tool can readily be torn off, since the major portion of insulation, between the parallel conductors, is cut.

The present invention has been illustrated in connection with a wire stripper tool for high frequency twin-lead, appliance cord, single wire and co-axial cable; various modifications of the device and the cutter blades thereof, in accordance with various requirements of uses and applications may be made within the inventive concept.

What is claimed is:

1. Wire stripper to strip insulation from electrical wires comprising
   an elongated housing having a hollow, longitudinally extending locating channel therein adapted to have the wire to be stripped passed therethrough, said channel having an end edge face substantially perpendicular thereto at its terminal end;
   a cutter blade movable perpendicularly to said channel from a withdrawn position to a position in front of the end face, and having cutting edges formed thereon defining a cutting zone extending adjacent the wire and piercing and severing a portion only of the insulation around the wire when the cutter blade is moved downwardly over the channel to extend in front of said channel;
   means limiting the movement over said edge face for a distance sufficient to cut into the insulation of the wire but insufficient to cut through the electrical conductors therein;
   and means guiding said cutter blade in a path substantially perpendicularly to said wire to be stripped.

2. Wire stripper according to claim 1, wherein said cutter blade is an elongated strip of resilient spring steel secured to the top of the housing and having a bent-over edge portion, said cutting edges being formed on said bent-over edge portion; said strip being removably secured to said housing, the bent-over edge portion being bent at approximately right angles to the lingitudinal extent of the strip, and said guide means guiding the edge portion in a cutting path in front of said channel and preventing lateral deflection of said end portion.

3. Wire stripper according to claim 1, to strip high-frequency lead-in parallel conductors, in which a pair of insulated conductors are separated from each other by an insulating web;
   wherein the channel is a flat, elongated opening of substantially greater width than height to accommodate said conductors and web;
   and said cutting edges are in the form of a central piercing point with angled cutting edges, said central point piercing and severing said web.

4. Wire stripper according to claim 3, wherein said cutter has a pair of unsharpened shoulders, one at each side of said piercing point.

5. Wire stripper according to claim 3, wherein said channel is about 11 mm. wide.

6. Wire stripper according to claim 1, to strip dual appliance cord, having a pair of parallel insulated conductors located side by side;
   wherein the channel is of a width of about twice its height, to accommodate said conductors, and wherein said cutting edges are in the form of a pair of lateral wings with convergingly angled sides and a central projection, to form a pair of cutting notches fitting around and over said parallel conductors.

7. Wire stripper according to claim 1, to strip co-axial cable, wherein said channel is of sufficient height to accommodate said co-axial cable, and said cutting edges are formed of a pair of lateral wings with convergingly angled sides and a round cutting notch fitting around and over the insulation of said co-axial cable.

8. Wire stripper according to claim 1, for universal application to strip twin-lead high-frequency conductors of both indoor and heavy-duty type, parallel appliance cord, and co-axial cable;

wherein said channel is a flat, elongated opening of sufficient width to accommodate said high-frequency conductors and having a central groove of sufficient height to accommodate the larger of said appliance cord conductors or co-axial cable;

and a plurality of cutter blades are provided, one of said cutter blades having angled cutting edges in the form of a central piercing point, and lateral, unsharpened shoulders at each side of said point, said central point being adapted to pierce and cut the web of indoor type twin-lead conductors;

another one of said cutter blades having cutting edges in the form of a pair of sharpened lateral wings and a central piercing point with an indentation between the junction of said wings and point, the corners formed by said indentation reaching around and over said conductors, and said central point being adapted to pierce and sever the web of heavy-duty high-frequency conductors;

another of said cutter blades having cutting edges in the form of a pair of lateral wings with convergingly angled sides and a central projection to form a pair of cutting notches fitting around and over said parallel appliance cord conductors;

and another of said cutter blades having cutting edges in the form of a U forming pair of lateral wings with convergingly angled sides and a round cutting notch fitting around and over the insulation of co-axial cable, said cutter blades being selectively mountable on said housing.

9. Wire stripper according to claim 1, wherein said means guiding said cutter blade comprises at least one cross bar spaced from and located in front of said end face and guiding means constraining said cutter blade against lateral deflection with respect to said channel in order to guide the cutting edges prependicularly into the insulation to be stripped and prevent off-center penetration of said cutting edges into the insulation.

10. Wire stripper according to claim 9, for universal application to strip the insulation from wire containing a pair of conductors located side by side, or from round wire having concentrically located conductors, wherein said channel is shaped to be of sufficient width and height to accommodate the larger of any of said conductors, and said cutting edges are in the form of a pair of lateral wings with convergingly angled inner sides, and a central projection therebetween forming a pair of cutting notches to fit over the sides, and the top of said conductor to be stripped, said projection cutting into the central region between the sides of said side conductors and over the top of the insulation of round wire.

11. Wire stripper according to claim 9, wherein said cutter blade is a single strip of spring steel removably mounted on said housing.

12. Wire stripper according to claim 1, including an elongated cover strip hinged to said housing at the end remote from said front end face; and means removably securing cutter blades at the other end of said cover strip.

13. Wire stripper according to claim 12, including a hook projection formed on said cover strip; a re-entrant bent-over resilient spring portion transverse to the cutting movement formed on said cutter blades, said re-entrant transverse portion fitting under the hook-projection of said cover strip, to removably secure said cutter elements to said strip.

14. Wire stripper according to claim 12, including spring means extending from a point intermediate the length of said channel towards said front end face, said spring means being resiliently depressible against the top of said channel; and a cutter holding tray located behind said spring means and towards the other end of said wire stripper and above said channel.

15. Wire stripper according to claim 14, wherein said spring means is removably secured to said cover strip.

16. Wire stripper according to claim 14, wherein said spring means is a bent-over strip, a portion of said bent-over strip defining a portion of said channel.

References Cited
UNITED STATES PATENTS

| | | | |
|---|---|---|---|
| 2,521,688 | 9/1950 | Cataldo et al. | 81—9.51 X |
| 3,254,407 | 6/1966 | Apa et al. | 30—91.2 |

TRAVIS S. McGEHEE, Primary Examiner

U.S. Cl. X.R.

81—9.51